I. A. MYSER.
VACUUM FLY TRAP.
APPLICATION FILED FEB. 19, 1908.
923,368.
Patented June 1, 1909.
2 SHEETS—SHEET 2.
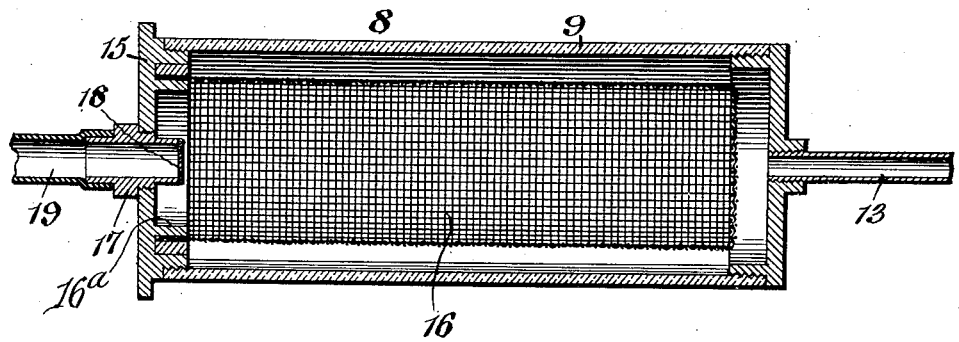
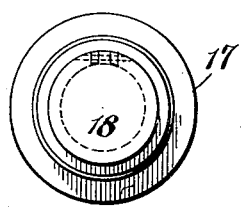
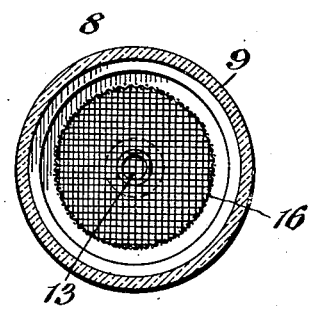
Witnesses
Howard D. Orr
Ida A. Myser, Inventor,
By
Attorney

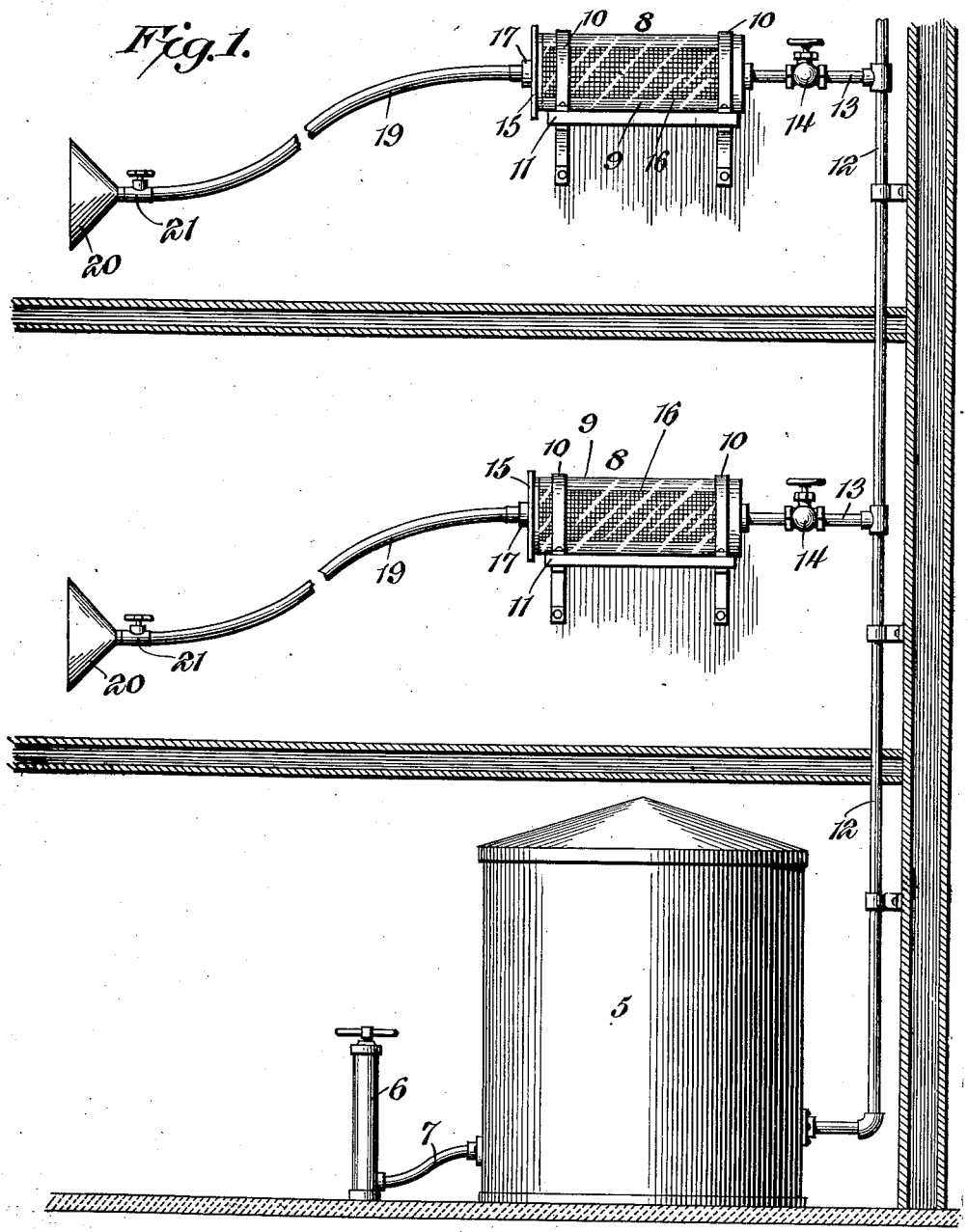

UNITED STATES PATENT OFFICE.

IDA A. MYSER, OF RIFLE, COLORADO.

VACUUM FLY-TRAP.

No. 923,363.

Specification of Letters Patent.

Patented June 1, 1909.

Application filed February 19, 1908. Serial No. 416,716.

*To all whom it may concern:*

Be it known that I, IDA A. MYSER, a citizen of the United States, residing at Rifle, in the county of Garfield and State of Colorado, have invented a new and useful Vacuum Fly-Trap, of which the following is a specification.

The principal object of the present invention is to provide vacuum mechanism for catching flies, and similar insects, said mechanism being of a character that can be placed in private dwellings or public institutions and constituting means whereby insects can be caught in large numbers, and conveniently disposed of.

One embodiment of the invention is illustrated in the accompanying drawings, wherein:—

Figure 1 is a sectional view through a portion of a building, showing the mechanism therein. Fig. 2 is a vertical sectional view on an enlarged scale through the trap proper. Fig. 3 is an end view of the catching conduit. Fig. 4 is a cross sectional view through the trap.

Similar reference numerals designate corresponding parts in all the figures of the drawings.

In the embodiment illustrated, a vacuum chamber, in the form of a closed tank 5, is employed that may be placed in any location desired, where it is out of the way. Means are provided for exhausting the air from this tank or chamber. In the present embodiment, this means is shown in the form of a vacuum pump 6 having a flexible connection 7 with the tank or conduit.

One or more traps 8 are employed, depending on the character of the system employed. Thus in the present embodiment, the tank 5 is shown in the basement of a building and two of the traps are placed on the floors above. Each trap consists of an outer casing, preferably a cylinder 9 of transparent material and having an open end. This cylinder is shown as being fastened by straps 10 to a shelf 11. A conduit 12 connected to the tank or chamber 5, has branches 13 connected to the casings and valves 14 are located in these branches. Heads 15 are threaded into the open ends of the casings and detachably fastened to said heads are cages 16. The connections between said heads and cages can be effected by any suitable means, and in the present structure, each cage is shown as detachably slipped on to an inwardly extending flange 16ª projecting from the inner face of the head. These cages are of less diameter and of less length than the cylinder, being arranged concentrically therein. Secured centrally in the heads are nipples 17 projecting beyond the inner faces of the heads and having inwardly opening flap valves 18 mounted thereon. The nipples also project beyond the outer faces of the heads and mounted on said nipples are flexible conduits 19 having secured to their free ends, funnels 20. Valves 21 are located in the conduits adjacent to the funnels.

In practice the air is first exhausted from the chamber 5, and in fact a partial vacuum is at all times maintained in said chamber. When the traps are not in use, the valves 14 and 21 are closed, but when it is desired to catch the flies or other insects, the valves 14 are opened, and the funnels are carried to the places where the flies have congregated, as for instance about the tables, on the walls or at the windows. The valve 21 is then opened, and the inrush of air caused by the vacuum in the chamber, will cause the flies to be carried through the conduits 19, past the valves 18 and into the cages. When it is desired to empty said cages, the same may be readily removed, by detaching the heads 15 and the insects can be destroyed in any suitable manner, the cage being slipped from the flange 16ª to permit the cage to be emptied.

One of the primary advantages of this construction is that no continuously operated fan or other device is necessary, because of the employment of the vacuum chamber. Therefore the apparatus is always ready for use, and is practicable for small dwelling houses as well as restaurants and other public places.

It will be understood that the apparatuses may be built any size which the occasion demands. When installed in large buildings, the vacuum tank will be placed in the basement and for smaller places, like residences, both the trap and tank may be placed on shelves in the rooms. For the larger type of apparatus, as for instance, in hospitals, apartment houses and the like, an automatic pump may be employed, but in any case the vacuum chamber or tank is utilized. Also the tank may be located at some central station and all the buildings in the neighborhood can be connected therewith by pipes and provided with traps to obtain the same results.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In mechanism for catching insects, the combination with a vacuum chamber, of means for exhausting the air therefrom, an insect trap comprising an outer casing, a conduit connecting the casing and vacuum chamber, a cage detachably mounted in the casing, a flexible conduit communicating with the interior of the cage, an insect receiving funnel carried by the free end of the flexible conduit, and means located adjacent to the funnel and movable therewith for controlling the passage of air through said funnel and flexible conduit.

2. In mechanism for catching insects, the combination with a vacuum chamber, of means for exhausting the air therefrom, a plurality of insect traps, each comprising an outer casing, a conduit connected to the vacuum chamber and having branches connected to the casings, a cage detachably mounted in each casing, a flexible conduit communicating with the interior of each cage and having its free end arranged to admit an insect, and a valve located in each flexible conduit adjacent to the funnel and movable therewith for controlling the passage of the air therethrough.

3. In mechanism for catching insects, the combination with a trap comprising a transparent tubular casing having an open end, of a head detachably engaged with and closing the open end of the casing, a tubular cage detachably mounted on the inner portion of the head within the casing and of less cross sectional area and of less length than the casing, said cage being located wholly within the casing, means for exhausting the air from the casing, a flexible conduit connected to the detachable head and communicating with the interior of the cage, a valve in the conduit, and a funnel connected to the free end of the conduit.

4. In mechanism for catching insects, the combination with a vacuum chamber, of means for exhausting the air therefrom, an insect trap comprising an outer casing and an inner cage removably mounted in the casing, a conduit connecting the vacuum chamber and the casing, said conduit communicating with said casing exteriorly of the cage, a valve located in the conduit, a flexible conduit communicating with the interior of the cage and having an open inlet end, and a valve located at said inlet end and movable with the same.

5. In mechanism for catching insects, the combination with a vacuum chamber, of means for exhausting the air therefrom, a stationary insect trap comprising an outer casing and an inner cage removably mounted in the casing, a conduit connecting the vacuum chamber and the casing, said conduit communicating with said casing exteriorly of the cage, a flexible conduit communicating with the interior of the cage and having an open inlet end movable to different positions with respect to the trap, and a valve located at said inlet end and movable therewith.

6. In mechanism for catching insects, the combination with a vacuum chamber, of a plurality of stationary insect traps, each comprising an outer casing and an inner cage removably mounted therein, a single conduit connecting the vacuum chamber and the various traps, said conduit having communication with the casings exteriorly of the cages, valves for separately controlling said communication, a plurality of flexible conduits leading to the interior of the cages, and having open mouthed funnels at their free ends that are movable to different positions with respect to the cages, valves located in the conduits at said ends, and movable therewith, and means for exhausting the air from the chamber.

In testimony, that I claim the foregoing as my own, I have hereto affixed my signature in the presence of two witnesses.

IDA A. MYSER.

Witnesses:
J. F. MYSER,
C. H. DURANT.